Oct. 6, 1964        D. H. HORST        3,151,908

DECK COVER

Filed Oct. 24, 1960        3 Sheets-Sheet 1

INVENTOR.
DONALD H. HORST

BY
R. E. Geangue
ATTORNEY

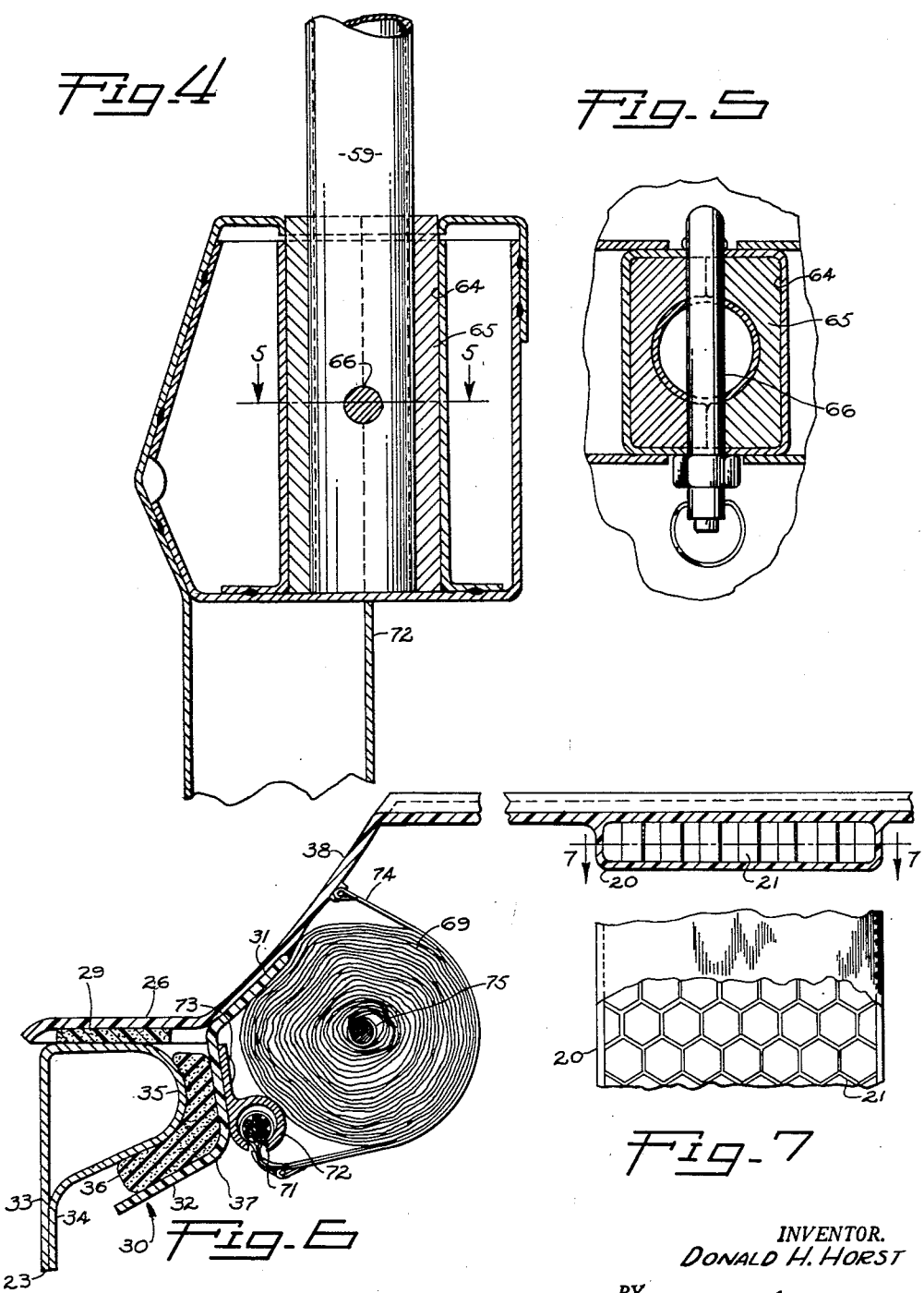

Oct. 6, 1964  D. H. HORST  3,151,908
DECK COVER
Filed Oct. 24, 1960  3 Sheets-Sheet 3
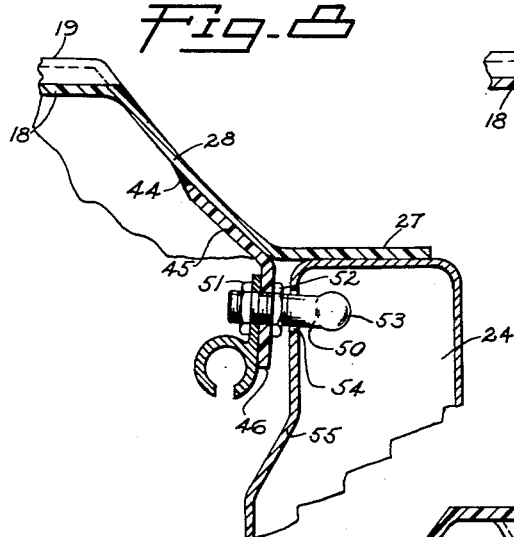
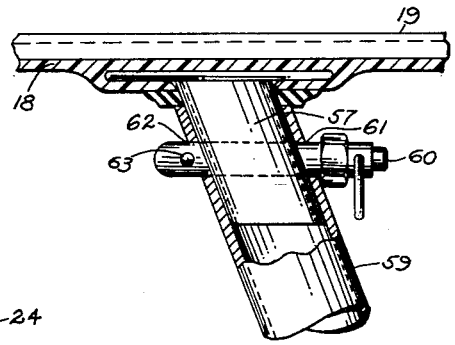
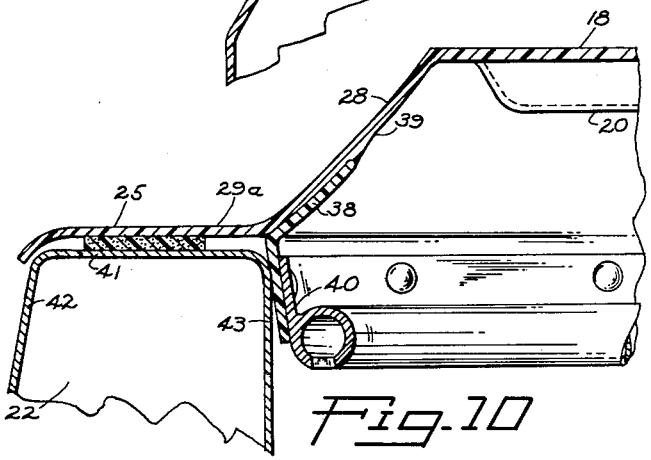
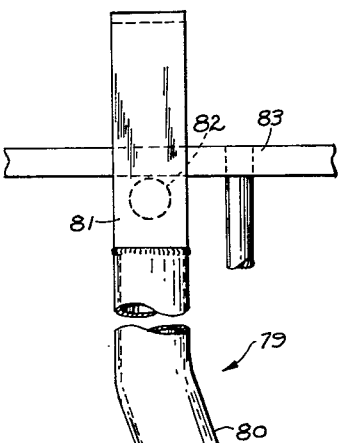
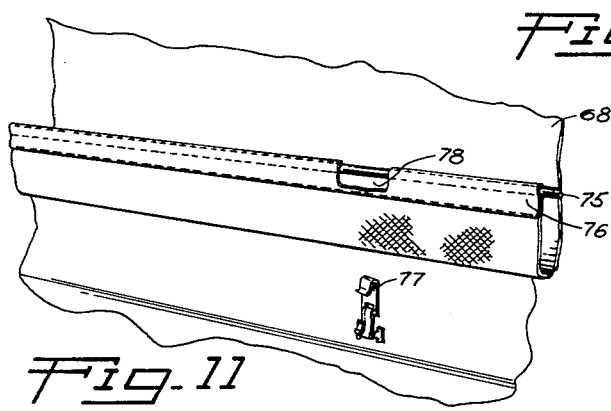
INVENTOR.
DONALD H. HORST
BY R. E. Geangue
ATTORNEY United States Patent Office 3,151,908
Patented Oct. 6, 1964

3,151,908
DECK COVER
Donald H. Horst, 18114 Karen Drive, Tarzana, Calif.
Filed Oct. 24, 1960, Ser. No. 64,538
2 Claims. (Cl. 296—100)

The present invention relates to an enclosure device and more particularly to a convertible deck cover for a pick-up truck.

In recent years many enclosure units have been developed for mounting on and enclosing the cargo area of an automotive vehicle, such as for example, a pick-up truck, and which are utilized in most instances as living quarters during camping trips. In fact, in recent years certain of these units have become very elaborate in construction and include built-in features and facilities which one would ordinarily associate with a permanent homesite. These units are ordinarily formed of some suitable rigid material, either plastic or metal, and because of their weight, once mounted on the truck, are usually a permanent fixture to the vehicle. A truck with mounted enclosure of the type presently available is hardly a dual purpose vehicle since substantial time and effort must be expended to remove the enclosure from the vehicle before the vehicle can be used for ordinary trucking purposes.

The convertible deck cover of the present invention is so designed as to provide a theft-proof shield for the cargo area of the pick-up truck which is moisture, dust, and temperature tight and, because of its construction, free of rattles. It is relatively light in weight and easily removable so that the truck is always available for use in connection with ordinary trucking jobs. The unit is also readily expandable so as to form an enclosed or open-sided structure for purposes such as sleeping, shelter, storage, etc.

It is therefore a primary object of the present invention to generally improve the design and construction of devices of this general type.

A further object of the present invention is to provide a deck cover for a cargo area which is relatively light in weight, easily attachable and detachable, moisture, dust, and temperature tight, and which can be easily converted into a wagon unit especially adaptable for shelter, storage, etc.

Another object of the present invention is to provide an attachable cover for the cargo area of an automotive vehicle, such as a pick-up truck, which is easily removable, relatively lightweight, which affords complete protection against the elements, and which is pleasing in appearance.

A still further object of the present invention is to provide a deck lid for enclosing a cargo area which is formed of suitable lightweight but highly rigid and durable material, which can be readily attached to or removed from said cargo area, and which can be supported in elevated position with respect to said cargo area or supported in any pre-determined angled or tilted position with reference thereto.

Other objects and advantages of the present invention will be readily apparent to those skilled in the art upon perusal of the following description and drawings in which:

FIG. 4 is a transverse vertical sectional view taken on the line 4—4 of FIG. 1, with parts broken away and slightly enlarged.

FIG. 5 is a sectional view taken on the line 5—5 of FIG. 4, with parts broken away.

FIG. 6 is a longitudinal vertical sectional view taken on the line 6—6 of FIG. 2, with parts broken away and slightly enlarged.

FIG. 7 is a cross-sectional view taken on the line 7—7 of FIG. 6, with parts broken away.

FIG. 8 is a longitudinal vertical sectional view taken on the line 8—8 of FIG. 2, with parts broken away and slightly enlarged.

FIG. 9 is a longitudinal vertical sectional view taken on the line 9—9 of FIG. 3, with parts broken away and slightly enlarged.

FIG. 10 is a transverse vertical sectional view taken on the line 10—10 of FIG. 2, with parts broken away and slightly enlarged.

FIG. 11 is a perspective view of curtain structure disclosed in FIG. 1, slightly enlarged.

FIG. 12 is a view similar to FIG. 9 disclosing the installation of an auxiliary support rack.

Figure 1:
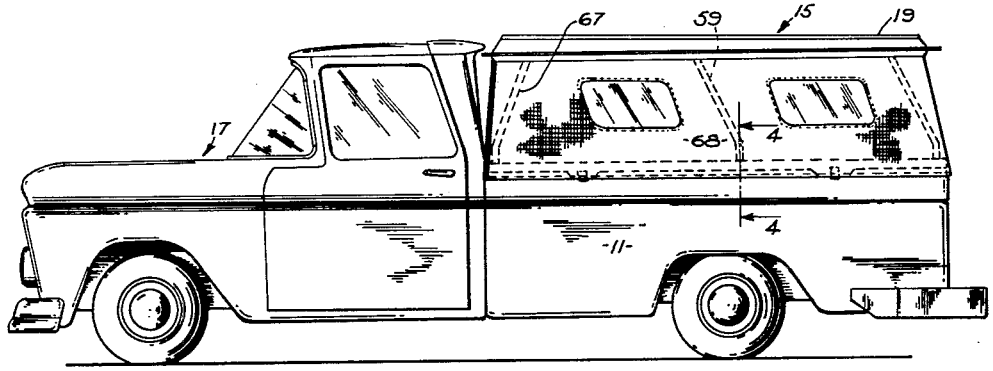
FIG. 1 is a side elevational view of the deck cover embodying the principles of the present invention mounted on a pick-up truck, and in its camper position.
Figure 2:
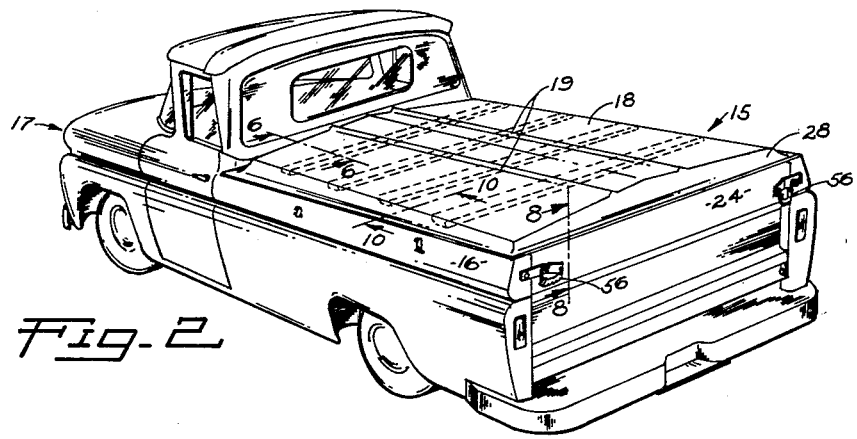
FIG. 2 is a perspective view of the combination disclosed in FIG. 1 showing the deck cover in its sealed position relative to the cargo area.
Figure 3:
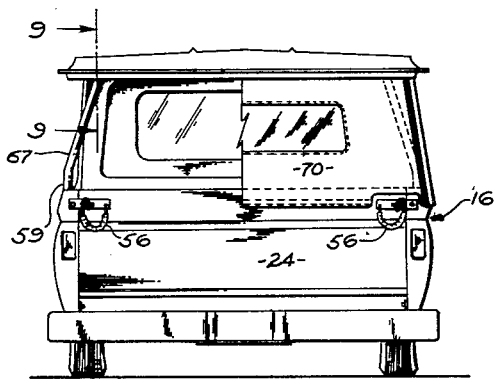
FIG. 3 is a rear view of the combination disclosed in FIG. 1, with parts broken away.

The principles of the present invention are broadly disclosed in FIGS. 1, 2 and 3 wherein a deck lid, broadly designated by the number 15, is shown mounted upon a cargo bed 16 of a pick-up truck 17. FIGS. 1 and 3 disclose the deck lid in its elevated position with reference to the cargo bed 16 with depending curtains in their lowered positions, as will be more fully described hereinafter for utilization as a camper or other weatherproof type enclosure, whereas FIG. 2 discloses the deck lid in its sealed position with reference to the cargo area of the cargo bed, in which position the cargo area is substantially theft-proof and sealed with reference to moisture, dust and temperature. Also, as will be more fully appreciated hereinafter, the deck is sufficiently light so that it can be easily elevated from the position disclosed in FIG. 2 to the positions disclosed in FIGS. 1 and 3, and which is formed of such material as to withstand the expected wear and tear such a device would normally be subject to in addition to being capable of supporting a substantial amount of weight, such as for example, luggage or similar type weighty articles which might be strapped to the deck during transport, or the weight of children who might crawl upon the deck during play.

Referring now more specifically to the details of construction, the deck lid comprises a center area element 18 preferably formed of reinforced fiberglass combined with sandwiched honeycombed structural members for effecting the necessary rigidity and durability while at the same time remaining extremely light in weight. It is substantially dome shaped in transverse cross-section and comprises a pair of longitudinally extending ribs 19 which afford longitudinal rigidity and a plurality of transverse tubular sections 20, see FIGS. 6 and 7, which enclose honeycombed plastic material 21 sandwiched therein. This combination of elements combines to afford the previously described rigidity and durability while at the same time provides a unit which is sufficiently light in weight to be easily elevated from the position disclosed in FIG. 2 to the position disclosed in FIG. 1 by the average person.

The deck, when in the sealed position disclosed in FIG. 2, is supported upon the side walls 22, a cab wall 23, and a tail gate 24 of the cargo bed 16 by side support shoulders 25, see FIG. 10, a front support shoulder or member 26, see FIG. 6, and a tail gate support shoulder 27, see FIG. 8, and the center area 18 is maintained in elevated position with respect to these support shoulders by interconnecting inwardly and upwardly inclined supporting webs 28. It will be appreciated that the interconnecting supporting webs have a reverse contour so that during travel, on the highway for example, these webs will create a negative lift factor and thereby utilize the force of the air stream to aid in retaining the deck lid in its proper position on the cargo bed.

Each of the side support shoulders 25 and the front support member 26 has a sealant 29a and 29, respectively, fixed to the underside thereof which is preferably formed of rubber and which seals the cargo bed when the deck lid is in the position disclosed in FIG. 2 against the elements as well as acting as an absorber of vibration transmitted from the cargo bed during travel. A hinge element 30 which is preferably S-shaped in configuration, is fixed in any suitable manner at 31 to the supporting web 28 adjacent the front support shoulder 26 and extends substantially the length thereof so that a leg 32 is in depending relationship with respect to said front support shoulder. The cab wall 23 of the cargo bed, which is of any conventional or suitable construction, is shown as being formed of 2 ply sheet metal construction 33 and 34, the upper edge being curled as indicated at 35. The depending leg 32 is so shaped as to conform substantially with the curve of said curl 35, and a sealant or buffer 36, which is preferably formed of rubber, is fixed adjacent the inner curve of said depending leg at 37.

A guide element 38, which is preferably L-shaped in configuration, is also fixed at 39 to each of the supporting webs 28 adjacent each of side support shoulders 25 and extends substantially the length thereof so that an arm 40 is in depending relationship with respect to each of said side support shoulders. The side walls 22 of the cargo bed are fabricated from sheet metal and conventionally have a top wall 41, with an outside wall 42, and an inner wall 43 depending from the top wall. The depending arms 40 of opposite sides are so spaced that they aid in guiding the deck lid upon the cargo bed and support the deck upon the cargo bed against side-to-side movement.

The supporting web 28 adjacent the tail gate support shoulder 27 also has fixed thereto at 44 a lock member 45 which is preferably L-shaped in configuration and extends substantially the length thereof and which has a leg 46 which depends downwardly from the support shoulder. A pair of locking studs 50 is fixed to the leg 46 in spaced-apart relationship by a pair of nuts 51 and 52, each of which has a rounded lock element 53 which is received in an opening 54 drilled into an inner wall 55 of the tail gate.

In positioning the deck lid, therefore, upon the cargo bed of the truck so that it is in the positioned disclosed in FIG. 2, it is first positioned so that the leg 32 and the front support shoulder 26 are in hinged relationship with respect to the curl 35 of the cab wall with the depending legs 40 in alignment with the inner walls 43 of the side walls 22. The deck is then swung downwardly and moved forwardly so that the front support shoulder sealant 29 and the buffer 36 are moved into sealing engagement with the curl 35. During this operation, the tail gate is in its lowered position. When the tail gate is then raised, the studs 50 are received in the openings 54, and with the tail gate locked by locking chain 56, the deck lid is securely fixed and sealed to the cargo bed. It will be appreciated that a padlock can be employed with the chain lock for locking the cargo area and making it virtually theft-proof.

To facilitate conversion of the deck lid from its sealed position, as disclosed in FIG. 2, to its camper position, as disclosed in FIG. 1, a plurality of socket posts 57 are molded into the deck lid adjacent its four corners, see FIG. 9, so that they are in depending relationship with respect thereto, and in the event, as disclosed in FIG. 1, the cargo bed is relatively long, intermediate socket posts are molded into the deck lid for center support purposes. Each of the socket posts 57 is telescopically received by one end of a support stake 59 and fixed thereto by a pin 60 received in the aligned openings 61 and 62, and locked by suitable ball locks 63.

The other end of each of the support stakes is received in stake openings 64 which are conventionally formed in all cargo beds, see FIGS. 4 and 5. To accommodate the support stakes in such stake openings, suitable spacers 65 are provided, and locking pins 66, similar in design to locking pins 60, are employed. It will be noted that each of the support stakes has a portion 67 which is upwardly and inwardly inclined with reference to the center of the cargo area to permit these support stakes to more effectively resist the load of the deck lid in addition to any additional weight carried on the lid, such as for example, lumber. It will also be appreciated that through the combination of these support stakes, the deck lid can be either supported in its substantially horizontal elevated position, such as disclosed in FIG. 1, or in an angled position, in which instance only the support stakes on one side would be employed, or in a tilted position, in which instance only the front or rear stakes would be employed. That is, in an angled position, the support stakes 59, shown on the left hand side wall in FIGURE 3 could be eliminated so that the left hand support shoulder 25 would engage the left hand side wall 22 while the right hand edge of the deck 15 remained in an elevated position on the support stakes 59 disposed along the right hand side wall 22. In a tilted position, the front and intermediate stakes 59 (FIGURE 1) would be eliminated so that the support member 26 would engage the cab wall 23 while the rear end of the deck 15 remained elevated with the rear stakes 59.

Suitable side curtains 68, a front curtain 69, and a back curtain 70 are provided for enclosing the cargo area when the deck lid is in its camper position. Each of these side curtains can be formed of any suitable flexible material, such as for example, plastic or canvas, and has a bead 71 adjacent its upper end which is received in a suitable slotted tubular support 72. A support 72 is fixed by a suitable fastening element 73 with the deck lid so as to carry the respective curtains in hanging relationship with respect to the sides, the front, and the back. When the curtains are not in use, they can be rolled, as disclosed in FIG. 6, and held in this rolled position adjacent the deck lid by a retainer strap 74. The curtains will unroll on release of the retainer straps into their depending position through the weight of a curtain rod 75 which is provided in a bottom seam 76 and can be fixed in their extended positions by means of suitable clips 77 which are positioned to receive the curtain rod through suitable openings 78 formed in the seam.

The support stakes 59 can also be used by carrying an auxiliary carrying rack 79, see FIG. 12. To utilize the auxiliary carrying rack, the deck lid is removed with the support stakes in their upright positions. An auxiliary pipe section 80 is then telescopically received in the open end of each of the support stakes and fixed therein by the pins 60. Each of the auxiliary pipe sections has a bent portion 81 which is positioned in vertical relation to the horizontal and the pipe sections of opposite support stakes are tied together by a suitable tie rod 82. Each of the pipe sections is formed of a length sufficient to position the tie rods above the truck cab so that articles 83 too long to be accommodated in the cargo bed itself can be carried upon this auxiliary carrying rack, such as for example, ladders, pipes, lumber, etc.

In reviewing, it will be noted that the deck cover of the present invention has the necessary rigidity and lightness in weight through its one piece fiberglass construction and that it is easily hingedly connected forwardly and retained in its position by the engagement of the locking studs with the tail gate. While the present invention is specifically disclosed with reference to the cargo bed of an automotive vehicle, it will be appreciated that it can be utilized for sealing and protecting many other types of cargo areas.

What is claimed is:

1. A convertible deck cover for a pickup type automotive vehicle having a cargo bed formed by sidewalls, a cabwall, a tailgate and stake receiving sockets in said sidewalls comprising a deck lid adapted to be supported in a raised position above and a lowered position on said sidewalls, cabwall and tailgate, said deck lid having a center element adapted to cover the cargo bed, shoulders extending laterally from the periphery of the center element and adapted to overlie the sidewalls, cabwall and tailgate of the vehicle, elongated flanges extending downwardly from the periphery of the center element adjacent at least two opposed edges of said center element, said flanges being spaced from the edges of the adjacent shoulders so as to extend in juxtaposed relation with the sidewalls of said cargo bed when said lid is in the lower position to form a cover for the cargo deck, means for releasably securing said lid in the lower position, a plurality of stakes, means on said lid to secure said stakes thereto, and the free ends of said stakes being received in said sockets to support said deck lid in a raised position spaced above the cargo bed to convert the vehicle into a camper.

2. A deck cover as defined in claim 1 including flexible curtains secured to said center element adjacent the periphery thereof and adapted to extend from said deck cover to the side walls and tailgate of said vehicle when said lid is in the raised position to form an enclosed compartment.

References Cited in the file of this patent

UNITED STATES PATENTS

| | | |
|---|---|---|
| 1,809,348 | Milner | June 9, 1931 |
| 1,932,327 | Tatum | Oct. 24, 1933 |
| 2,056,563 | Budd | Oct. 6, 1936 |
| 2,230,635 | Alderfer | Feb. 4, 1941 |
| 2,846,262 | Ray | Aug. 5, 1958 |
| 2,886,375 | Crawford | May 12, 1959 |
| 2,901,286 | Harris | Aug. 25, 1959 |
| 2,912,276 | Schwartz | Nov. 10, 1959 |
| 2,925,303 | Lane | Feb. 16, 1960 |
| 2,963,313 | Bennett | Dec. 6, 1960 |
| 2,989,340 | Penner | June 20, 1961 |
| 3,009,212 | Makens | Nov. 21, 1961 |
| 3,012,814 | Penner | Dec. 12, 1961 |